Figure 1:
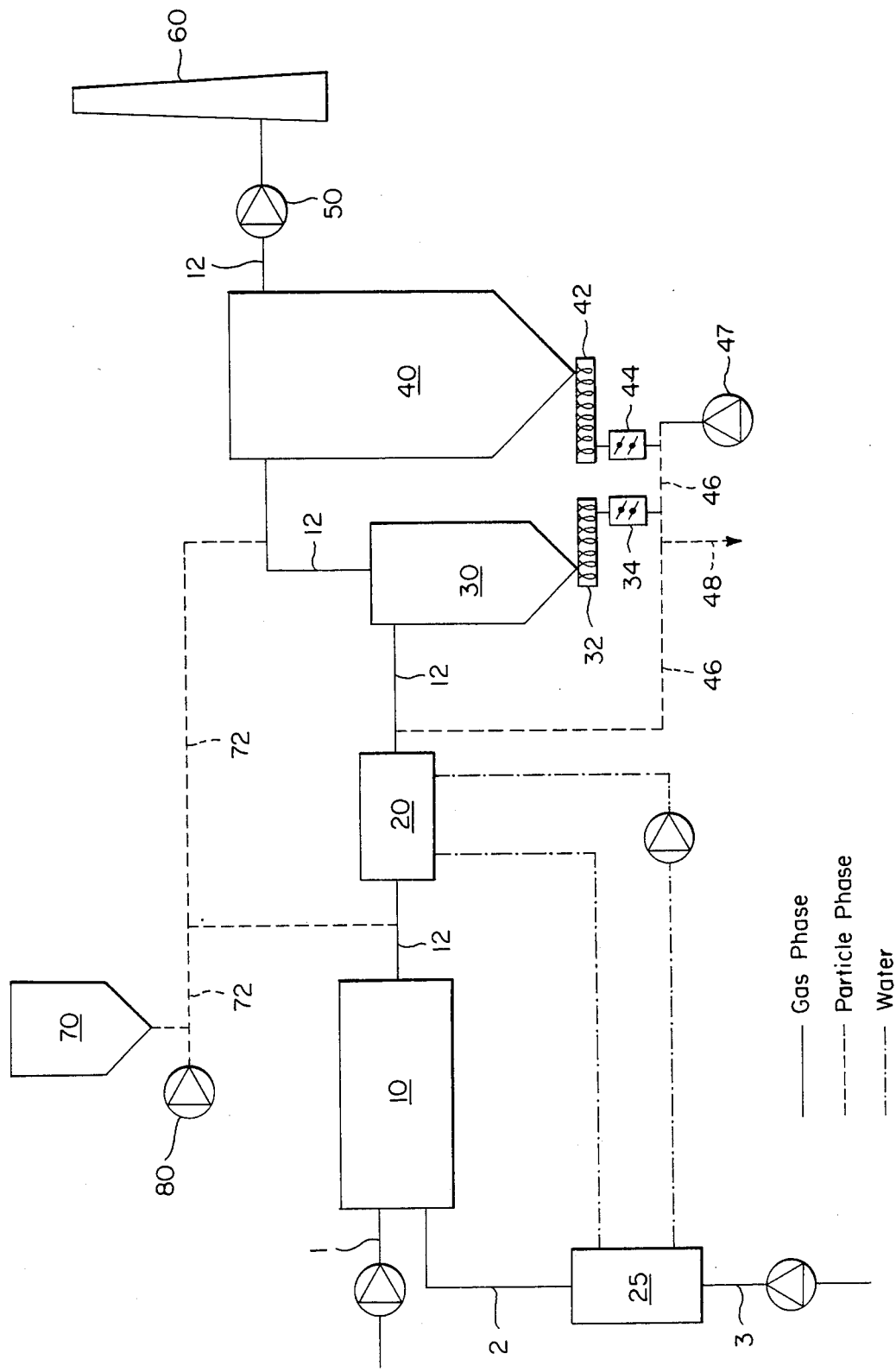

United States Patent [19]
Nielsen et al.

[11] Patent Number: 4,792,440

[45] Date of Patent: Dec. 20, 1988

[54] PROCESS FOR DESULPHURIZATION OF FLUE GAS

[75] Inventors: Carsten Nielsen, Kongerslev; Ejler L. Holm, Gistrup; Jens P. Sandeman; Hanne F. Madsen, both of Aalborg, all of Denmark

[73] Assignee: Aalborg Vaerft A/S, Aalborg, Denmark

[21] Appl. No.: 935,173

[22] Filed: Nov. 26, 1986

[30] Foreign Application Priority Data

Nov. 28, 1985 [DK] Denmark ............................ 5528/85
Nov. 17, 1986 [DK] Denmark ............................ 5487/86

[51] Int. Cl.$^4$ .......................... B01J 8/00; C01B 17/00
[52] U.S. Cl. ...................................... 423/244; 423/242
[58] Field of Search .......... 423/242 A, 242 R, 244 A, 423/244 R

[56] References Cited

U.S. PATENT DOCUMENTS

| | | | |
|---|---|---|---|
| 3,343,908 | 9/1967 | Wickert | 423/244 |
| 4,509,436 | 4/1985 | Schrofelbauer et al. | 106/345 |
| 4,519,995 | 5/1985 | Schrofelbauer et al. | 423/244 |
| 4,559,211 | 12/1985 | Feldman et al. | 423/242 |
| 4,590,049 | 5/1986 | Staudinger | 423/244 |
| 4,603,037 | 7/1986 | Yoon | 423/244 |

FOREIGN PATENT DOCUMENTS

2174081 10/1986 United Kingdom .

OTHER PUBLICATIONS

G. M. Blythe et al., "Dry Systems," Flue Gas Desulphurization Technology, Feb. 1980, pp. 179–195.

*Primary Examiner*—Gregory A. Heller
*Attorney, Agent, or Firm*—Fleit, Jacobson, Cohn & Price

[57] ABSTRACT

In a process for purification, in particular desulphurization, of flue gas from the combustion of sulphur-containing fuel in a combustion furnace, fresh, alkaline absorption agent selected among oxides and hydroxides of calcium, magnesium and the alkai metals, is added in the flue gas channel from the combustion furnace, and the formed reaction product is separated from the flue gas.

By adding the absorption agent drily after adjusting the water-dewpoint of the flue gas and/or the temperature of the flue gas so that the distance between dewpoint temperature and flue gas temperature is 5°–50° C., preferably 10°–20° C., a very effective desulphurization is obtained.

17 Claims, 2 Drawing Sheets

PROCESS FOR DESULPHURIZATION OF FLUE GAS

The present invention relates to a process for purification, in particular desulphurization, of flue gas from the combustion of sulphur-containing fuel in a combustion furnace, in which process a fresh alkaline absorption agent selected from among oxides and hydroxides of calcium, magnesium and the alkali metals, is added to the flue gas channel leading from said combustion furnace, and the reaction product formed is separated from the flue gas.

In the present context "combustion furnace" shall mean any bplant for conducting a combustion process, including boilers and installations for combustion of waste materials. By "sulphur-containing fuel" is meant all types of sulphur-containing fuels including coil, oil, biofuel, various waste products, and natural gas.

Various gases are generated during the combustion of these fuels, which, for environmental reasons, must be removed before the flue gas can be expelled into the atmosphere. These undesirable gases are e.g. HCl, HF, $H_2S$, $SO_3$, and above all $SO_2$. The present invention aims to reduce the contents of these undesirable gases to an acceptable level in the flue gas and therefore broadly involves a purification thereof. In the following specification the invention will in particular be described in connection with desulphurization.

Known desulphurization processes may primarily be divided in two main types, namely desulphurization in the combustion furnace as such, and desulphurization in the flue gas channel outside the furnace.

For desulphurization in combustion furnaces, particularly boilers, it is well known to introduce an alkaline absorption agent, in particular limestone ($CaCO_3$) and hydrated lime ($Ca(OH)_2$), whereby the following reactions take place:

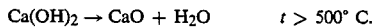
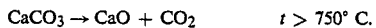
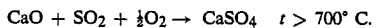

$$Ca(OH)_2 \rightarrow CaO + H_2O \quad t > 500°\ C.$$
$$CaCO_3 \rightarrow CaO + CO_2 \quad t > 750°\ C.$$
$$CaO + SO_2 + \tfrac{1}{2}O_2 \rightarrow CaSO_4 \quad t > 700°\ C.$$

The calcium sulphate formed will as solid particles be expelled with the flue gas, wherefrom it may be removed together with fly ash, e.g., by means of suitable filters, in particular bag filters or one or more separation cyclones. Despite persistent efforts until now, it has not been possible to obtain—even by extremely high lime consumption—greater than about 60% desulphurization in the boiler. Such a degree of desulphurization is regarded as unacceptably low, and desulphurization in the combustion furnace must therefore in almost all cases be supplemented with further purification of the flue gas. It is furthermore recognized today that $CaSO_4$ (plaster of Paris) is not well suited for waste deposition as it is somewhat soluble in water and therefore in time will be washed out. $CaSO_3$ is less soluble in water and therefore more useful for deposition, but it cannot be formed by desulphurization in a combustion furnace, because at the existing temperature conditions the excess of air forces the process shown above to proceed.

A number of processes are also known for removal of $SO_2$ and other acid gas components from the flue gas, cf. e.g. U.S. Pat. Nos. 4,197,278, 4,324,770 and 4,279,873. These processes are generally of three types, namely the wet-method, the semi-wet-method and the dry-method. It is a common characteristic of these processes, where desulphurization is performed on the flue gas as such, that generally they require often costly additional process equipment, such as f.ex. spray-drying plants and mixing tanks.

Finally, a number of processes are known, which combine desulphurization in the combustion furnace and desulphurization of the flue gas.

In a process according to PCT application WO No. 85/02453 an alkaline absorption agent, preferably $CaCO_3$, is first added to the combustion furnace, whereby part of the sulphur is bound as sulphate, and a first filtration is performed in a dry-separator, e.g. an electrofilter. The resultant product essentially consists of $CaSO_4$ and fly ash. The deposition problems already discussed will, accordingly, be observed. Furthermore, it will not be possible, after such processing, to independently utilize the fly ash, an otherwise useful product. The filtered flue gas is then cooled to a temperature below 400° C., a further alkaline absorption agent, e.g. CaO, $Ca(OH)_2$ an/or $Mg(OH)_2$ is added, and preferably a gas drying agent, e.g. $CaCl_2$, and a new filtration, preferably in bag filter, is performed.

In a process according to U.S. Pat. No. 4,509,436 an alkaline absorption agent, preferably CaO or $CaCO_3$, is first added to the combustion furnace. Next, the flue gas with excessive, unreacted CaO together with particles of fly ash and sulphate is directed to a heat exchanger, wherein a preliminary cooling is performed, and the flue gas is filtered, preferably in bag filter. A portion of the particles separated from the filter is further cooled and directed back in the flue gas in order to cool this to the water-dewpoint. The purpose of this step is to form a water film on the surface of the ash particles so that unreacted excess CaO from the furnace may be converted into $Ca(OH)_2$, which again leads to the reaction

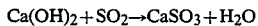

$$Ca(OH)_2 + SO_2 \rightarrow CaSO_3 + H_2O$$

A process according to U.S. Pat. No. 4,519,995 is based upon the same principles, but rather than cooling the flue gas with cooled recirculated particles, an increase of the relative water content in the flue gas is proposed by recirculating cooled flue gas or injecting water.

Both the U.S. Pat. No. 4,509,436 and the U.S. Pat. No. 4,519,995 patented processes yield a deposition product containing a mixture of sulphate and fly ash, resulting in the above-mentioned deposition problems and the inability to independently utilize the fly ash. Furthermore, the addition of $CaCO_3$ to the combustion furance substantially increases the risk of deadburning excess CaO, which is formed by calcination, and which may only with difficulty be "opened" by establishment of a moist milieu in the flue gas.

The present invention is based upon the unexpected recognition that a very effective desulphurization may be obtained without desulphurization in the combustion furnace, only by adding dry, fresh, alkaline absorption agent to the flue gas from the combustion furnace, provided that the water-dewpoint or the temperature of the flue gas, before adding the absorption agent, is adjusted so that the current temperature of the flue gas is only slightly above the water-dewpoint of the flue gas.

In this connection "fresh" alkaline absorption agent means absorbent added from outside of the system of combustion furnace and flue gas channel, in contrast to the well known additions via the combustion furnace.

The process according to the invention is characterized in that the absorption agent is added drily at a primary insert point after adjusting the water-dewpoint of the flue gas and/or the temperature of the flue gas, so that the distance between dewpoint temperature and flue gas temperature is 5°-50° C., preferably 10°-20° C.

By said adjustment it is contemplated to obtain a maximum, relative water content in the flue gas without risk of condensation of liquid water. Under these conditions it has been found that the flue gas contents of $SO_2$ quickly and willingly reacts with the absorption agent to form the corresponding sulphite, preferably $CaSO_3$, which in conventional manner may be separated from the flue gas.

By the process according to the invention there may as mentioned be obtained a very effective desulphurization, which in dependence of the selected process parameters, as further explained below, may approach 100%. As a result, there is absolutely no need to perform desulphurization in the combustion furnace, thereby avoiding the above-mentioned problems observed with known processes. If desired, the fly ash may be separated from the flue gas before the dewpoint adjustment or in a particular embodiment of the invention, as explained below, it may be filtered selectively off simultaneously with the reaction product formed with the sulphur content of the flue gas, whereby in both cases the possibility of a separate utilization of the fly ash is obtained. In proportion to known desulphurization processes on the flue gas alone, there is obtained a more effective desulphurization, better heat economy, better possibility of separate utilization of fly ash and desulphurization products andd/or possibility of using more simple process equipment.

According to the invention, the absorption agent is added drily to the flue gas, whereby is meant that it is not a question of a solution, suspension or other liquid or semi-liquid form, although an absolutely anhydrous product does not have to be in question. For economical and practical reasons the preferred absorption agent is pulverulent hydrated lime, which in practice is about 90% pure $Ca(OH)_2$ with a low water content up to 5%.

In the process herein disclosed, the flue gas channel functions as a tube reactor. The flue gas from the combustion furnace will typically arrive at this reactor at a temperature in the order of 150° C., but essentially higher temperatures are also possible, in particular when the flue gas has not been subjected to a filtration in electrofilter or separation cyclone. The relative water content is low in proportion to the conditions, which are contemplated by the process according to the present invention, and the necessary adjustment of the distance to the dewpoint may either be performed by lowering the temperature of the flue gas or by adding water from outside, or by a combination of both. According to a preferred embodiment the water-dewpoint is adjusted by addition of liquid water. According to another and more preferred embodiment, the distance to the dewpoint is adjusted by lowering the flue gas temperature by passage through a heat exchanger. When the flue gas from the combustion furnace has a temperature in the order of 150° C., a cooling to about 55°-60° C. will typically cause that the contemplated adjustment of the distance to the dewpoint is obtained for the usual absolute moisture content from a combustion process. According to M. Satriana, New Developments in flue gas desulphurization technology, Pollution Technology Review No. 82, Noyes Data Corp., Park Ridge, N.J., USA, 1981, it is known that the reaction between $SO_2$ and a drily injected absorption agent proceeds best at temperatures above 200° C., whereby the $SO_2$-removal should be increasing at increasing temperatures. This is also in accordance with the fact that the reaction with the drily injected absorption agent does not proceed, or proceeds only with difficulty, at the usual temperature of the flue gas in the order of 150° C., which makes it so much more unexpected and surprising that the reaction may proceed effectively after the preferred cooling according to the invention. According to the invention it is furthermore preferred that the heat exchanger is an air-preheater, which heat-exchanges with fresh air to the combustion furnace. In this manner the heat content of the flue gas is optimally utilized. Such an air-preheater may be configurated as a known tubular heat exchanger of the countercurrent type. The heat exchanger may also be configured to reheat the flue gas after desulphurization.

By cooling of the flue gas there is a risk of condensation of acid gases, e.g. $SO_3$, HCl and HF, whereby the heat exchanger may corrode. This may be prevented by manufacturing the heat exchanger of acid resistant material or by performing a coating or enamelling of the heating surface. However, according to the invention it is preferred to eliminate the corrosion problem by adding additional fresh, alkaline absorption agent at a secondary insert point, which in the flow direction of the flue gas is before the heat exchanger. In this way the acid gases are neutralized, a principle which in itself is known from published Swedish patent specification No. 437,123.

As mentioned above, the flue gas channel acts as a tube reactor, and its length is dimensioned in conventional manner in view of the diameter or cross section of the flue gas channel, to obtain a residence time, which preferably shall be at least ½–1 second from the primary insert point for the absorption agent to the point where the reaction product is removed. If necessary, the residence time may be prolonged by inserting a whirling chamber in the reaction channel, which, however, preferably is avoided because of the loss of effect.

The reaction product formed by the reaction between the flue gas and the absorption agent may be separated from the flue gas in any known manner with filters, including electrofilters, or separation cyclones, in particular by means of bag filters of the type described in U.S. Pat. No. 4,197,278. Such bag filters may consist of woven cloth or steel web, their sizes and numbers being dimensioned according to filtration requirements. The bag filters are emptied at intervals determined by balancing the desirability of obtaining the longest possible residence time on the filters against the undesirability of having the increased pressure drop observed with the increasing build-up of solids. The pressure drop over the bag filters may in known manner be counterbalanced by inserting one or more suction draft blowers in the flue gas channel after the bag filters.

The filtered solid product may be directed to depot or further manufacturing, but according to the invention it is preferred that part of the product be recirculated for mixture with the dewpoint-adjusted flue gas, said recirculation being made to an intermediary insert point, which in the flow direction of the flue gas is before said primary insert point.

According to a further preferred embodiment of the invention, a separator may be inserted in the flue gas channel, wherein part of the solid reaction mixture is separated from the flue gas, before this reaches the above mentioned filter. As this filter preferably is a bag filter, an inserted separator may reduce the load thereon. The inserted separator is preferably a cyclone, whereby the residence time in the flue gas channel is prolonged. By embodying such a cyclone as a socalled multi-cyclone filter, it is possible to selectively remove the fly ash from the other solid particles, which would not be possible if the filtration merely took place on a bag filter. The separated solid products from the inserted separator or cyclone may be directed to depot or further manufacturing, but it is preferred that at least part of the product be recirculated together with the recirculated mixture from said bag filter to the flue gas channel. When a separator as mentioned above is inserted in the flue gas channel, it is preferred that the primary insert point of fresh alkaline absorption agent lies after said separator, i.e. in the preferred embodiment between the cyclone and the bag filter. Hereby fresh absorption agent is inserted at a point, where the flow gas has a relatively low content of $SO_2$, and it becomes possible to remove this residual amount. Alternatively, the primary insert point may be before the cyclone so that the desulphurization therein is increased.

The degree of desulphurization which may be obtained by the process according to the invention depends essentially on amount of alkaline absorption agent added in proportion to the sulphur content, and the degree of recirculation. With commercial hydrated lime as absorption agent, a degree of desulphurization approaching 100% may be obtained by the addition of about 3 mole Ca per mole S in the flue gas, and recirculation in an amount corresponding to 10 times the weight of solid particles in the system. By a higher recirculation rate, close to 100% desulphurization may be obtained by addition of down to 2 moles Ca per mole S in the flue gas. However, such a high degree of desulphurization is rarely necessary in practice, and in many cases with conventional coal types with a sulphur content of 1-1.5% by weight, a degree of desulphurization of 75% will be adequate.

This may be obtained by means of the invented process by using in the order of 1.0 mole Ca per mole S in the flue gas, and a recirculation rate in the order of 10 times. In view hereof it is preferred according to the invention that the fresh absorption agent is added in excess, preferably 1.0-1.6, in particular 1.0-1.1 mole Ca per mole S in the flue gas and that a part of the mixture containing reaction product and unreacted absorption agent after separation from the flue gas is recirculated for mixture with the dewpoint-adjusted flue gas.

Figure 2:
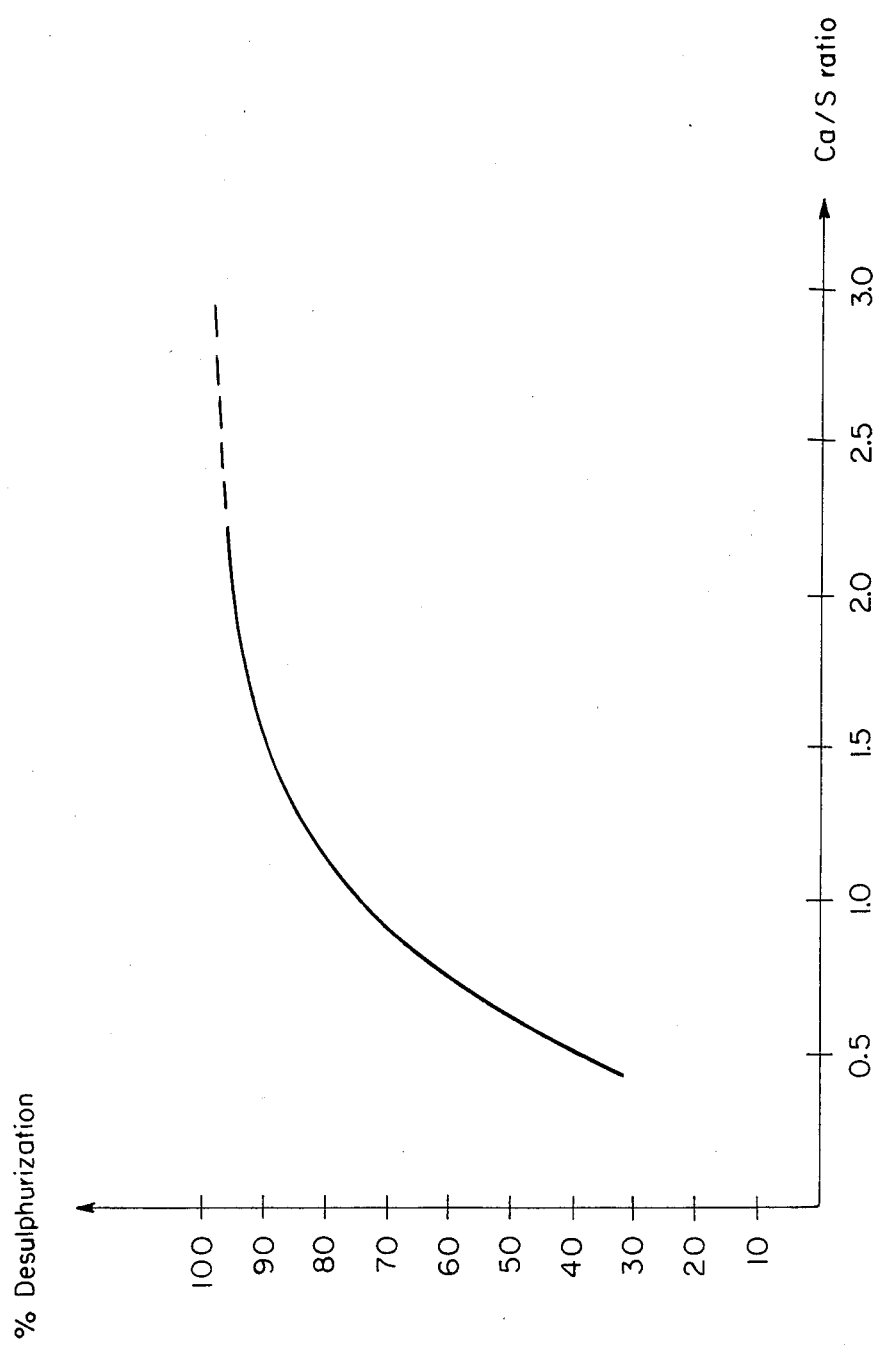

A preferred embodiment of the process according to the invention will now be illustrated with reference to the drawing, wherein FIG. 1 shows a plant being useful for embodying the process and FIG. 2 shows a graph of desulphurization as a function of Ca/S-mole ratio.

Referring now to FIG. 1 a fuel is introduced at 1 into a combustion furnace 10, which e.g. may be a boiler. Fresh air is introduced at 2 and the formed flue gas is directed along with solid combustion particles including fly ash through a flue gas channel 12. The flue gas channel leads via a possible, not shown, separator, which may be an electrofilter for removing fly ash, to a flue gas cooler or heat exchanger 20. In the example shown, this is in heat conducting connection with an air-preheater 25, which from a conduit 3 preheats primary air for introduction into the combustion furnace 10 via conduit 2. From the heat exchanger 20 the flue gas channel leads to a separator 30 being embodied as a cyclone, and from here to a separator being embodied as a filter 40, e.g. a bag filter. Finally, the flue gas channel leads via a suction draft blower 50 to chimney 60. A silo 70 stores alkaline absorption agent, e.g. hydrated lime, which by means of a blowing device 80, e.g. a high-pressure blower, is injected via conduit 72 directly into the flue gas channel 12 at a primary insert point between the cyclone 30 and the filter 40. By means of a regulation device (not shown) part of the absorption agent may be directed from conduit 72 through a conduit 74, which at a secondary insert point ends in the flue gas channel 12 before the heat exchanger 20. The solid particles being separated on the filter 40 are at the bottom directed by means of a transportation mechanism 42 and a control mechanism 44 to a conduit 46, whereto also solid particles from the cyclone 30 are directed via transportation mechanism 32 and control mechanism 34. A blower 47 forwards the particles in the conduit 46 to an intermediary insert point on the flue gas channel 12 between the heat exchanger 20 and the cyclone 30. From the conduit 46 part of the solid particles are removed and directed to depot or further manufacturing via conduit 48.

As an example, standard coal containing 1.0-1.3% S is fired at 1 into the boiler 10. Dry, particulate hydrated lime is injected via a conduit 74 in an amount corresponding to about 0.1 to about 0.2 mole Ca per mole S in the flue gas, whereas the remainder of the desired amount of hydrated lime corresponding to a total Ca/S mole/mole ratio of 1.0 is dry-injected via the conduit 72. At the point where the conduit 74 ends in the flue gas channel 12, the flue gas has a temperature of about 150° C., whereby the lime neutralizes the flue gas contents of $SO_3$, HCl, HF and similar acid products. In the heat exchanger 20 the flue gas is cooled to a temperature of about 55°-60° C., which for the usual water content from a combustion process means that the flue gas now has a temperature, which is 15°-20° C. above the water-dewpoint. The lime being added via conduit 72 reacts with $SO_2$ in the flue gas according to the reaction

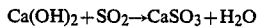

$$Ca(OH)_2 + SO_2 \rightarrow CaSO_3 + H_2O$$

Unreacted $Ca(OH)_2$ and the $CaSO_3$ formed are deposited on the filter 40, wherefrom the mixture is collected at suitable intervals and divided into a stream to depot via 48 and a recirculation stream via conduit 46. The unused recirculated $Ca(OH)_2$ reacts with $SO_2$ in the dewpoint-adjusted flue gas, which is directed to the cyclone 30, wherein $CaSO_3$ is separated along with unused $Ca(OH)_2$. Also this product is divided into a stream to depot via 48 and a recirculation stream via 46. If a filter, e.g. an electrofilter for removing fly ash has not been inserted between the boiler 10 and the heat exchanger 20, fly ash will be separated in the cyclone 30, possibly as an individual fraction. At a recirculation amount via conduit 46 of about 10 times the weight of solid particles in the system, a degree of desulphurization of about 75% was obtained under the other conditions as stated.

FIG. 2 shows a graph illustrating the degrees of desulphurization for Ca/S-mole ratios from about 0.4 to about 3.0 for a dewpoint-distance of 15°–20° C. and a recirculation rate of 10.

As mentioned in the preamble, the present invention involves in its broadest sense purification of flue gases, and not only desulphurization, althogh this is regarded as the most important for the time being. Any other undesired gas component, such as e.g. HCl, HF or $H_2S$, which can be absorbed by means of the alkaline absorption agent, may in a similar manner be removed by means of the process according to the present invention.

We claim:

1. A process for desulphurization of flue gas generated during the combustion of sulphur-containing fuel in a combustion furnace, said process comprising the steps of adding fresh alkaline absorption agent selected from among oxides and hydroxides of calcium, magnesium and the alkali metals, to flue gas in a flue gas channel leading from said combustion furnace for desulphurization of the flue gas outside of said combustion furnace, and separating from the flue gas the reaction product formed by said adding of fresh alkaline absorption agent, said addition of said absorption agent is done in dry form at a primary insert point after adjustment by a heat exchanger means of the relative water content of the flue gas by adjustment of the temperature of the flue gas so that the flue gas temperature becomes 5°–50° C. above the dewpoint, additional fresh, absorption agent is added in dry form at a secondary point which, in the flow direction of the flue gas, is before said heat exchanger means, said absorption agent is added in molar excess, with respect to S in the flue gas, and a mixture containing reaction product and unreacted absorption agent after separation from the flue gas is recirculated for mixture with the dewpoint-adjusted flue gas.

2. Process according to claim 1, wherein the absorption agent is pulverulent, hydrated lime.

3. Process according to claim 1, wherein said heat exchanger means is an air-preheater heat exchanger with fresh air to the combustion furnace.

4. Process according to claim 1, wherein the flue gas temperature is preferably 10°–20° C. above the dewpoint.

5. Process according to claim 1, wherein said absorption agent is calcium and is added in molar excess of 1.0–1.6 mole Ca per mole S in the flue gas.

6. Process according to claim 1, wherein said absorption agent is calcium and is added in molar excess of 1.0–1.1 mole Ca per mole S in the flue gas.

7. Process according to claim 1, wherein said mixture containing reaction product and unreacted absorption agent is recirculated to an intermediary insert point, which in the flow direction of the flue gas lies before said primary insert point.

8. Process according to claim 7, wherein a first separator is inserted between said intermediary and said primary insert point, and a second separator is inserted after said primary insert point, the recirculating mixture being a mixture separated from said first or said second separator, or both of said separators.

9. Process according to claim 1, wherein fly ash is separated before adjusting the flue gas temperature.

10. Process according to claim 8, wherein said first separator is a cyclone, wherein fly ash may be separated from reaction product and unreacted absorption agent.

11. Process according to claim 8, wherein said second separator is a bag filter.

12. A process for desulphurization of flue gas generated during the combustion of sulphur-containing fuel in a combustion furnace, said process comprising the steps of adding only outside of said combustion furnace fresh alkaline absorption agent selected from among oxides and hydroxides of calcium, magnesium and the alkali metals, to flue gas in a flue gas channel leading from said combustion furnace for desulphurization of the flue gas outside of said combustion furnace, separating from the flue gas the reaction product formed by said adding of fresh alkaline absorption agent, said addition of said absorption agent is done in dry form at an insert point after adjustment by a heat exchanger means of the relative water content of the flue gas by adjustment of the temperature of the flue gas so that the flue gas temperature becomes 5°–50° above the dewpoint, additional fresh, absorption agent is added in dry form at a secondary point which, in the flow direction of the flue gas, is before said heat exchanger, said absorption agent is added in molar excess, with respect to S in the flue gas, and a mixture containing reaction product and unreacted absorption agent after separation from the flue gas is recirculated for mixture with the dewpoint-adjusted flue gas, said mixture, containing reaction product and unreacted absorption agent, is recirculated to another insert point, which in the flow direction of the flue gas lies before said insert point.

13. Process according to claim 12, wherein the absorption agent is pulverulent, hydrated lime.

14. Process according to claim 12, wherein fly ash is separated before adjusting the flue gas temperature.

15. Process according to claim 11, wherein the flue gas temperature is preferably 10°–20° C. above the dewpoint.

16. Process according to claim 12, wherein said absorption agent is calcium and is added in molar excess of 1.0–1.6 mole Ca per mole S in the flue gas.

17. Process according to claim 12, wherein said absorption agent is calcium and is added in molar excess of 1.0–1.1 mole Ca per mole S in the flue gas.

* * * * *